(12) United States Patent
Mohan et al.

(10) Patent No.: US 11,928,571 B2
(45) Date of Patent: Mar. 12, 2024

(54) METHOD, SYSTEM, AND COMPUTER PROGRAM PRODUCT FOR TRAINING DISTRIBUTED MACHINE LEARNING MODELS

(71) Applicant: Visa International Service Association, San Francisco, CA (US)

(72) Inventors: Shivam Mohan, Bengaluru (IN); Sudharshan Krishnakumar Gaddam, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 650 days.

(21) Appl. No.: 16/950,129

(22) Filed: Nov. 17, 2020

(65) Prior Publication Data
US 2022/0156649 A1    May 19, 2022

(51) Int. Cl.
  *G06N 20/20*   (2019.01)
  *G06N 3/045*   (2023.01)
  *G06N 3/084*   (2023.01)

(52) U.S. Cl.
  CPC ............. *G06N 20/20* (2019.01); *G06N 3/045* (2023.01); *G06N 3/084* (2013.01)

(58) Field of Classification Search
  CPC ......... G06N 20/20; G06N 3/045; G06N 3/084
  See application file for complete search history.

(56) References Cited

U.S. PATENT DOCUMENTS

| | | | | |
|---|---|---|---|---|
| 2008/0120260 | A1* | 5/2008 | Yancey | G06N 3/063 706/33 |
| 2018/0336458 | A1* | 11/2018 | Tomioka | G06N 3/08 |
| 2020/0117992 | A1* | 4/2020 | Srinivasan | G06N 3/047 |

FOREIGN PATENT DOCUMENTS

WO    2017176356 A2    10/2017

OTHER PUBLICATIONS

Gaunt et al., "AMPNet: Asynchronous Model-Parallel Training for Dynamic Neural Networks", arXiv.org, 2017, 18 pages, retrieved from https://arxiv.org/abs/1705.09786v3.

* cited by examiner

*Primary Examiner* — Marshall L Werner
(74) *Attorney, Agent, or Firm* — The Webb Law Firm

(57) ABSTRACT

Provided is a method for training distributed machine learning models. The method may include initializing a distributed machine learning model on a plurality of computing devices. Training data associated with a plurality of samples may be received. Each sample may be forward propagated through the distributed machine learning model to generate an output. A loss for each sample of the plurality of samples may be determined based on the output. The loss for each sample may be backward propagated to each computing device. The parameter(s) of each computational node may be asynchronously updated based on the loss as it is backward propagated and/or while at least one of the samples is forward propagating. The parameter(s) may be stored and/or communicated to the other computing devices. Each of the other computing devices of the plurality of computing devices may store the parameter(s). A system and computer program product are also disclosed.

17 Claims, 9 Drawing Sheets

METHOD, SYSTEM, AND COMPUTER PROGRAM PRODUCT FOR TRAINING DISTRIBUTED MACHINE LEARNING MODELS

BACKGROUND

1. Field

This disclosed subject matter relates generally to methods, systems, and products for distributed machine learning models and, in some particular embodiments or aspects, to a method, system, and computer program product for training distributed machine learning models.

2. Technical Considerations

Certain machine learning models (e.g., deep neural networks and/or the like) may have a large number (e.g., hundreds, thousands, and/or the like) of layers and/or a large number (e.g., thousands, millions, and/or the like) of computational nodes (e.g., neurons and/or the like). Once trained, such machine learning models may perform their desired tasks (e.g., prediction, classification, clustering, and/or the like) very well. For example, the performance of deep neural network is often correlated with the number of layers and/or neurons in the neural network (e.g., as the number of layers and/or neurons increases, the performance may improve). Additionally, the performance of deep neural network may be dependent on having a sufficient amount of training data (e.g., a large number of training samples). For example, for supervised learning, deep neural networks may perform well when extensively trained with large amounts of normally distributed training samples.

However, training such machine learning models may be challenging. For example, training such machine learning models (e.g., deep neural networks) may be highly resource intensive. As the number of layers and/or neurons of a deep neural network increases, the mathematical complexity of calculating the desired distribution function may also increase, which in turn may increase the requirement for computational resources (e.g., computing power, memory, and/or the like). Additionally, as the number of training samples increases, the amount of time to iterate through the training samples during each training epoch may become prohibitively high (e.g., days, weeks, and/or the like).

Moreover, for distributed machine learning models (e.g., deep neural networks with neurons distributed among a plurality of computing devices), training time may be prohibitively long due to the serial nature of execution of such distributed machine learning models and communication lag introduced because of communication over a network between the computing devices of the distributed system. For example, deep neural networks are trained by updating their parameters only when an epoch (e.g., a logical iteration of the entire training sample set and/or the like) completes.

SUMMARY

Accordingly, it is an object of the presently disclosed subject matter to provide methods, systems, and computer program products for training distributed machine learning models.

According to non-limiting embodiments or aspects, provided is a method for training distributed machine learning models. In some non-limiting embodiments or aspects, a method for training distributed machine learning models may include initializing a distributed machine learning model on a plurality of computing devices. The distributed machine learning model may include a plurality of computational nodes. Each computing device of the plurality of computing devices may include a respective subset of the plurality of computational nodes. Each computational node may include at least one parameter. Training data associated with a plurality of samples may be received at a first computing device of the plurality of computing devices. Each sample of the plurality of samples may be forward propagated through the distributed machine learning model to generate an output for each sample of the plurality of samples. A loss for each sample of the plurality of samples may be determined based on the output. The loss for each sample of the plurality of samples may be backward propagated to each computing device of the plurality of computing devices. The at least one parameter of each computational node may be asynchronously updated based on the loss for each sample as the loss for each sample is backward propagated while at least one of the plurality of samples is forward propagating through the distributed machine learning model. The at least one parameter of each computational node of the respective subset of the plurality of computational nodes, as updated, may be store at each computing device of the plurality of computing devices. Data associated with the at least one parameter of each computational node of the respective subset of the plurality of computational nodes, as updated, may be communicate from each computing device of the plurality of computing devices to all other computing devices of the plurality of computing devices, each of the other computing devices of the plurality of computing devices storing the at least one parameter of each computational node as updated.

In some non-limiting embodiments or aspects, the distributed machine learning model may include a deep neural network and each computational node of the plurality of computational nodes comprises a neuron.

In some non-limiting embodiments or aspects, the plurality of computational nodes may be divided into a plurality of layers, each subset of computational nodes being associated with at least one layer of the plurality of layers, each layer being implemented on at least one of the plurality of computing devices.

In some non-limiting embodiments or aspects, the at least one parameter of each computational node may include at least one of a weight parameter, a bias parameter, or any combination thereof.

In some non-limiting embodiments or aspects, storing the at least one parameter of each computational node may include storing the at least one parameter of each computational node in at least one cache memory of each computing device of the plurality of computing devices.

In some non-limiting embodiments or aspects, the at least one parameter of each computational node of the plurality of computational nodes may be stored in a backup storage.

In some non-limiting embodiments or aspects, forward propagating may include communicating, from each computing device of the plurality of computing devices other than a last computing device, an intermediate output of the respective subset of the plurality of computational nodes to a next computing device of the plurality of computing devices via a first message queue.

In some non-limiting embodiments or aspects, backward propagating may include communicating, from each computing device of the plurality of computing devices other than the first computing device, a gradient value associated with the loss associated with the respective subset of the plurality of computational nodes to a previous computing device of the plurality of computing devices via a second message queue.

In some non-limiting embodiments or aspects, a label for each sample of the plurality of samples may be stored in a database. Additionally or alternatively, determining the loss may include determining the loss for each sample of the plurality of samples based on the output and the label.

In some non-limiting embodiments or aspects, a variance in the at least one parameter for each computational node may be determined. Additionally or alternatively, at least one new computational node may be generated on at least one computing device of the plurality of computing devices based on the variance of at least one computational node of the respective subset of the plurality of computational nodes.

In some non-limiting embodiments or aspects, the loss for a first sample of the plurality of samples may be determined to satisfy a threshold associated with at least one computing device of the plurality of computing devices becoming unavailable before determining the variance in the at least one parameter for each computational node.

According to non-limiting embodiments or aspects, provided is a system for training distributed machine learning models. In some non-limiting embodiments or aspects, the system for training distributed machine learning models may include a plurality of computing devices. Each computing device of the plurality of computing devices may include a respective subset of a plurality of computational nodes of a distributed machine learning model. Each computational node may include at least one parameter. Each computing device may include at least one processor and at least one non-transitory computer-readable medium including one or more instructions that, when executed by the at least one processor, cause the at least one processor to: forward propagate each sample of a plurality of samples of training data through the distributed machine learning model to generate an output for each sample of the plurality of samples; determine a loss for each sample of the plurality of samples based on the output; backward propagate the loss for each sample of the plurality of samples to each computing device of the plurality of computing devices; asynchronously update the at least one parameter of each computational node based on the loss for each sample as the loss for each sample is backward propagated while at least one of the plurality of samples is forward propagating through the distributed machine learning model; store, at each computing device of the plurality of computing devices, the at least one parameter of each computational node of the respective subset of the plurality of computational nodes as updated; and communicate, from each computing device of the plurality of computing devices to all other computing devices of the plurality of computing devices, data associated with the at least one parameter of each computational node of the respective subset of the plurality of computational nodes as updated, each of the other computing devices of the plurality of computing devices storing the at least one parameter of each computational node as updated.

In some non-limiting embodiments or aspects, the distributed machine learning model may include a deep neural network and each computational node of the plurality of computational nodes may include a neuron. Additionally or alternatively, the plurality of computational nodes may be divided into a plurality of layers, each subset of computational nodes being associated with at least one layer of the plurality of layers, each layer being implemented on at least one of the plurality of computing devices.

In some non-limiting embodiments or aspects, each computing device of the plurality of computing devices may include at least one cache memory. Additionally or alternatively, storing the at least one parameter of each computational node may include storing the at least one parameter of each computational node in the at least one cache memory of each computing device of the plurality of computing devices.

In some non-limiting embodiments or aspects, the system may further include a backup storage. Additionally or alternatively, the backup storage may store the at least one parameter of each computational node of the plurality of computational nodes.

In some non-limiting embodiments or aspects, the system may further include a first message queue. Additionally or alternatively, forward propagating may include communicating, from each computing device of the plurality of computing devices other than a last computing device, an intermediate output of the respective subset of the plurality of computational nodes to a next computing device of the plurality of computing devices via the first message queue.

In some non-limiting embodiments or aspects, the system may further include a second message queue. Additionally or alternatively, backward propagating may include communicating, from each computing device of the plurality of computing devices other than a first computing device, a gradient value associated with the loss associated with the respective subset of the plurality of computational nodes to a previous computing device of the plurality of computing devices via the second message queue.

In some non-limiting embodiments or aspects, the system may further include a database configured to store a label for each sample of the plurality of samples. Additionally or alternatively, determining the loss may include determining the loss for each sample of the plurality of samples based on the output and the label.

In some non-limiting embodiments or aspects, the one or more instructions, when executed by the at least one processor, may further cause the at least one processor to determine a variance in the at least one parameter for each computational node and generate at least one new computational node on at least one computing device of the plurality of computing devices based on the variance of at least one computational node of the respective subset of the plurality of computational nodes.

According to non-limiting embodiments or aspects, provided is a computer program product for training distributed machine learning models. The computer program product may include at least one non-transitory computer-readable medium including one or more instructions that, when executed by at least one processor, cause the at least one processor to initialize a respective subset of a plurality of computational nodes of a distributed machine learning model. Each computational node may include at least one parameter. Training data associated with a plurality of samples may be received. Each sample of the plurality of samples may be forward propagated through the respective subset of the plurality of computational nodes of the distributed machine learning model to generate an intermediate output for each sample of the plurality of samples. A gradient value associated with a loss associated with the respective subset of the plurality of computational nodes may be determined for each sample of the plurality of samples. The gradient value for each sample of the plurality of samples may be backward propagated through the respective subset of the plurality of computational nodes of the distributed machine learning model. The at least one parameter of each computational node may be asynchronously updated based on the gradient value associated with the loss for each sample as the gradient value associated with the loss for each sample is backward propagated while at least one of the plurality of samples is forward propagating through the distributed machine learning model. The at least one parameter of each computational node of the respective subset of the plurality of computational nodes, as updated, may be stored. Data associated with the at least one parameter of each computational node of the respective subset of the plurality of computational nodes, as updated, may be communicated to at least one other computing device to cause the at least one other computing device to store the at least one parameter of each computational node as updated.

Further embodiments or aspects are set forth in the following numbered clauses:

Clause 1: A computer-implemented method, comprising: initializing a distributed machine learning model on a plurality of computing devices, the distributed machine learning model comprising a plurality of computational nodes, each computing device of the plurality of computing devices comprising a respective subset of the plurality of computational nodes, each computational node comprising at least one parameter; receiving training data associated with a plurality of samples at a first computing device of the plurality of computing devices; forward propagating each sample of the plurality of samples through the distributed machine learning model to generate an output for each sample of the plurality of samples; determining a loss for each sample of the plurality of samples based on the output; backward propagating the loss for each sample of the plurality of samples to each computing device of the plurality of computing devices; asynchronously updating the at least one parameter of each computational node based on the loss for each sample as the loss for each sample is backward propagated while at least one of the plurality of samples is forward propagating through the distributed machine learning model; storing, at each computing device of the plurality of computing devices, the at least one parameter of each computational node of the respective subset of the plurality of computational nodes as updated; and communicating, from each computing device of the plurality of computing devices to all other computing devices of the plurality of computing devices, data associated with the at least one parameter of each computational node of the respective subset of the plurality of computational nodes as updated, each of the other computing devices of the plurality of computing devices storing the at least one parameter of each computational node as updated.

Clause 2: The method of clause 1, wherein the distributed machine learning model comprises a deep neural network and each computational node of the plurality of computational nodes comprises a neuron.

Clause 3: The method of any preceding clause, wherein the plurality of computational nodes are divided into a plurality of layers, each subset of computational nodes being associated with at least one layer of the plurality of layers, each layer being implemented on at least one of the plurality of computing devices.

Clause 4: The method of any preceding clause, wherein the at least one parameter of each computational node comprises at least one of a weight parameter, a bias parameter, or any combination thereof.

Clause 5: The method of any preceding clause, wherein storing the at least one parameter of each computational node comprises storing the at least one parameter of each computational node in at least one cache memory of each computing device of the plurality of computing devices.

Clause 6: The method of any preceding clause, further comprising storing, in a backup storage, the at least one parameter of each computational node of the plurality of computational nodes.

Clause 7: The method of any preceding clause, wherein forward propagating comprises communicating, from each computing device of the plurality of computing devices other than a last computing device, an intermediate output of the respective subset of the plurality of computational nodes to a next computing device of the plurality of computing devices via a first message queue.

Clause 8: The method of any preceding clause, wherein backward propagating comprises communicating, from each computing device of the plurality of computing devices other than the first computing device, a gradient value associated with the loss associated with the respective subset of the plurality of computational nodes to a previous computing device of the plurality of computing devices via a second message queue.

Clause 9: The method of any preceding clause, further comprising storing, in a database, a label for each sample of the plurality of samples, wherein determining the loss comprises determining the loss for each sample of the plurality of samples based on the output and the label.

Clause 10: The method of any preceding clause, further comprising: determining a variance in the at least one parameter for each computational node; and generating at least one new computational node on at least one computing device of the plurality of computing devices based on the variance of at least one computational node of the respective subset of the plurality of computational nodes.

Clause 11: The method of any preceding clause, further comprising: determining the loss for a first sample of the plurality of samples satisfies a threshold associated with at least one computing device of the plurality of computing devices becoming unavailable before determining the variance in the at least one parameter for each computational node.

Clause 12: A system, comprising: a plurality of computing devices, each computing device of the plurality of computing devices comprising a respective subset of a plurality of computational nodes of a distributed machine learning model, each computational node comprising at least one parameter, each computing device comprising at least one processor and at least one non-transitory computer-readable medium including one or more instructions that, when executed by the at least one processor, cause the at least one processor to: forward propagate each sample of a plurality of samples of training data through the distributed machine learning model to generate an output for each sample of the plurality of samples; determine a loss for each sample of the plurality of samples based on the output; backward propagate the loss for each sample of the plurality of samples to each computing device of the plurality of computing devices; asynchronously update the at least one parameter of each computational node based on the loss for each sample as the loss for each sample is backward propagated while at least one of the plurality of samples is forward propagating through the distributed machine learning model; store, at each computing device of the plurality of computing devices, the at least one parameter of each computational node of the respective subset of the plurality of computational nodes as updated; and communicate, from each computing device of the plurality of computing devices to all other computing devices of the plurality of computing devices, data associated with the at least one parameter of each computational node of the respective subset of the plurality of computational nodes as updated, each of the other computing devices of the plurality of computing devices storing the at least one parameter of each computational node as updated.

Clause 13: The system of clause 12, wherein the distributed machine learning model comprises a deep neural network and each computational node of the plurality of computational nodes comprises a neuron, and wherein the plurality of computational nodes are divided into a plurality of layers, each subset of computational nodes being associated with at least one layer of the plurality of layers, each layer being implemented on at least one of the plurality of computing devices.

Clause 14: The system of one of clauses 12 or 13, wherein each computing device of the plurality of computing devices comprises at least one cache memory, and wherein storing the at least one parameter of each computational node comprises storing the at least one parameter of each computational node in the at least one cache memory of each computing device of the plurality of computing devices.

Clause 15: The system of any one of clauses 12-14, further comprising a backup storage, wherein the backup storage is configured to store the at least one parameter of each computational node of the plurality of computational nodes.

Clause 16: The system of any one of clauses 12-15, further comprising a first message queue, wherein forward propagating comprises communicating, from each computing device of the plurality of computing devices other than a last computing device, an intermediate output of the respective subset of the plurality of computational nodes to a next computing device of the plurality of computing devices via the first message queue.

Clause 17: The system of any one of clauses 12-16, further comprising a second message queue, wherein backward propagating comprises communicating, from each computing device of the plurality of computing devices other than a first computing device, a gradient value associated with the loss associated with the respective subset of the plurality of computational nodes to a previous computing device of the plurality of computing devices via the second message queue.

Clause 18: The system of any one of clauses 12-17, further comprising a database configured to store a label for each sample of the plurality of samples, wherein determining the loss comprises determining the loss for each sample of the plurality of samples based on the output and the label.

Clause 19: The system of any one of clauses 12-18, wherein the one or more instructions, when executed by the at least one processor, further cause the at least one processor to: determine a variance in the at least one parameter for each computational node; and generate at least one new computational node on at least one computing device of the plurality of computing devices based on the variance of at least one computational node of the respective subset of the plurality of computational nodes.

Clause 20: A computer program product comprising at least one non-transitory computer-readable medium including one or more instructions that, when executed by at least one processor, cause the at least one processor to: initialize a respective subset of a plurality of computational nodes of a distributed machine learning model, each computational node comprising at least one parameter; receive training data associated with a plurality of samples; forward propagate each sample of the plurality of samples through the respective subset of the plurality of computational nodes of the distributed machine learning model to generate an intermediate output for each sample of the plurality of samples; determine a gradient value associated with a loss associated with the respective subset of the plurality of computational nodes for each sample of the plurality of samples; backward propagate the gradient value for each sample of the plurality of samples through the respective subset of the plurality of computational nodes of the distributed machine learning model; asynchronously update the at least one parameter of each computational node based on the gradient value associated with the loss for each sample as the gradient value associated with the loss for each sample is backward propagated while at least one of the plurality of samples is forward propagating through the distributed machine learning model; store the at least one parameter of each computational node of the respective subset of the plurality of computational nodes as updated; and communicate, to at least one other computing device, data associated with the at least one parameter of each computational node of the respective subset of the plurality of computational nodes as updated to cause the at least one other computing device to store the at least one parameter of each computational node as updated.

These and other features and characteristics of the presently-disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

Figure 1:
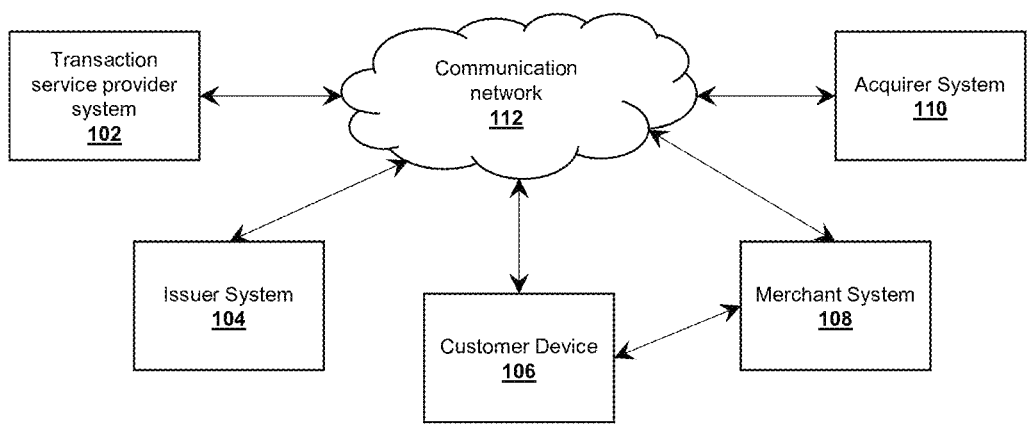
FIG. 1 is a diagram of a non-limiting embodiment or aspect of an environment in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments or aspects, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments or aspects of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed BINs as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments or aspects of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for distributed machine learning models, including, but not limited to, training distributed machine learning models. For example, non-limiting embodiments of the disclosed subject matter provide asynchronously updating the at least one parameter of each computational node of a distributed machine learning model (e.g., having a plurality of computational nodes on a plurality of computing devices) based on the loss for each training sample as the loss is backward propagated and while at least one of the plurality of samples is forward propagating, and each computing device of the plurality of computing devices may store the parameter(s) of each computational node of a respective subset of the computational nodes thereon and communicate such parameter(s) to the other computing devices so that all computing devices may store the (up to date) parameters of all computational nodes in the distributed machine learning model. Such embodiments provide techniques and systems that allow for using a distributed system to share (e.g., balance, optimize, and/or the like) the computational resource requirements across a plurality of computing devices while also reducing training time (e.g., compared to serially operating machine learning models). Additionally or alternatively, such embodiments provide techniques and systems that enable asynchronous updating of the parameter(s) (e.g., in parallel with the forward propagation of training samples), which allows for incremental benefits of training individual computational nodes while training samples are being forward propagated through the distributed machine learning model. Additionally or alternatively, such embodiments provide techniques and systems that enable updating of the parameter(s) without waiting for an entire training epoch and/or without waiting for a loss for an individual training sample to back propagate fully through the distributed machine learning model. As such, the distributed machine learning model may be trained more quickly since less epochs (e.g., iterations through the training samples) may be required due to the benefits of training (e.g., updated parameters) being applied while at least some of the training samples are being forward propagated (e.g., instead of waiting until the next epoch) and the total time for forward propagating and backward propagating during each epoch may be reduced since both forward propagation and backward propagation occur in parallel (e.g., rather than serially such that backward propagation does not begin until forward propagation is complete). Additionally or alternatively, such embodiments provide techniques and systems that reduce the impact of communication lag introduced because of communication over a network since forward propagation and backward propagation occur in parallel. Additionally or alternatively, such embodiments provide techniques and systems that enable dynamic scaling and/or self-healing since forward propagation and backward propagation occur in separate processes and each computing device has access to (e.g., stores, communicates with a service that stores, and/or the like) the parameter(s) of all computational nodes of the distributed machine learning model, since an individual computing device may determine based on the backward propagation (e.g., loss, gradient, variance, and/or the like) that a computational node should be added (or removed) while training samples are forward propagating through the distributed machine learning model. Additionally or alternatively, such embodiments provide techniques and system that enable each computing device (e.g., a controller process thereof) and/or a controller service to have a full view of (e.g., copy of, access to, and/or the like) the parameter(s) of every computational node of the distributed machine learning model without being responsible for the calculations of every computational node. As such, each computing device (e.g., a controller process thereof) and/or a controller service may be aware of the role of every layer and every computational node in each layer of the distributed machine learning model For the purpose of illustration, in the following description, while the presently disclosed subject matter is described with respect to methods, systems, and computer program products for training distributed machine learning models, one skilled in the art will recognize that the disclosed subject matter is not limited to the illustrative embodiments or aspects. For example, the methods, systems, and computer program products described herein may be used with a wide variety of settings, such as using distributed machine learning models in any setting suitable, e.g., fraud detection, authorization/approval of payment transactions, risk management, cyber security, and/or the like.

Referring now to FIG. 1, FIG. 1 is a diagram of a non-limiting embodiment or aspect of an environment 100 in which systems, products, and/or methods, as described herein, may be implemented. As shown in FIG. 1, environment 100 includes transaction service provider system 102, issuer system 104, customer device 106, merchant system 108, acquirer system 110, and communication network 112.

Transaction service provider system 102 may include one or more devices capable of receiving information from and/or communicating information to issuer system 104, customer device 106, merchant system 108, and/or acquirer system 110 via communication network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via communication network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via communication network 112. Additionally or alternatively, each customer device 106 may include a device capable of receiving information from and/or communicating information to other customer devices 106 via communication network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via communication network 112. Merchant system 108 may also include a device capable of receiving information from customer device 106 via communication network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via communication network 112, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via communication network 112. For example, acquirer system 110 may include a computing device, a server, a group of servers, and/or the like. In some non-limiting embodiments or aspects, acquirer system 110 may be associated with an acquirer as described herein.

Communication network 112 may include one or more wired and/or wireless networks. For example, communication network 112 may include a cellular network (e.g., a long-term evolution (LTE) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 106, a POS device of merchant system 108, and/or the like) may initiate the transaction, e.g., by generating an authorization request. Additionally or alternatively, the client device (e.g., customer device 106, at least one device of merchant system 108, and/or the like) may communicate the authorization request. For example, customer device 106 may communicate the authorization request to merchant system 108 and/or a payment gateway (e.g., a payment gateway of transaction service provider system 102, a third-party payment gateway separate from transaction service provider system 102, and/or the like). Additionally or alternatively, merchant system 108 (e.g., a POS device thereof) may communicate the authorization request to acquirer system 110 and/or a payment gateway. In some non-limiting embodiments or aspects, acquirer system 110 and/or a payment gateway may communicate the authorization request to transaction service provider system 102 and/or issuer system 104. Additionally or alternatively, transaction service provider system 102 may communicate the authorization request to issuer system 104. In some non-limiting embodiments or aspects, issuer system 104 may determine an authorization decision (e.g., authorize, decline, and/or the like) based on the authorization request. For example, the authorization request may cause issuer system 104 to determine the authorization decision based thereof. In some non-limiting embodiments or aspects, issue system 104 may generate an authorization response based on the authorization decision. Additionally or alternatively, issuer system 104 may communicate the authorization response. For example, issuer system 104 may communicate the authorization response to transaction service provider system 102 and/or a payment gateway. Additionally or alternatively, transaction service provider system 102 and/or a payment gateway may communicate the authorization response to acquirer system 110, merchant system 108, and/or customer device 106. Additionally or alternatively, acquirer system 110 may communicate the authorization response to merchant system 108 and/or a payment gateway. Additionally or alternatively, a payment gateway may communicate the authorization response to merchant system 108 and/or customer device 106. Additionally or alternatively, merchant system 108 may communicate the authorization response to customer device 106. In some non-limiting embodiments or aspects, merchant system 108 may receive (e.g., from acquirer system 110 and/or a payment gateway) the authorization response. Additionally or alternatively, merchant system 108 may complete the transaction based on the authorization response (e.g., provide, ship, and/or deliver goods and/or services associated with the transaction; fulfill an order associated with the transaction; any combination thereof; and/or the like).

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
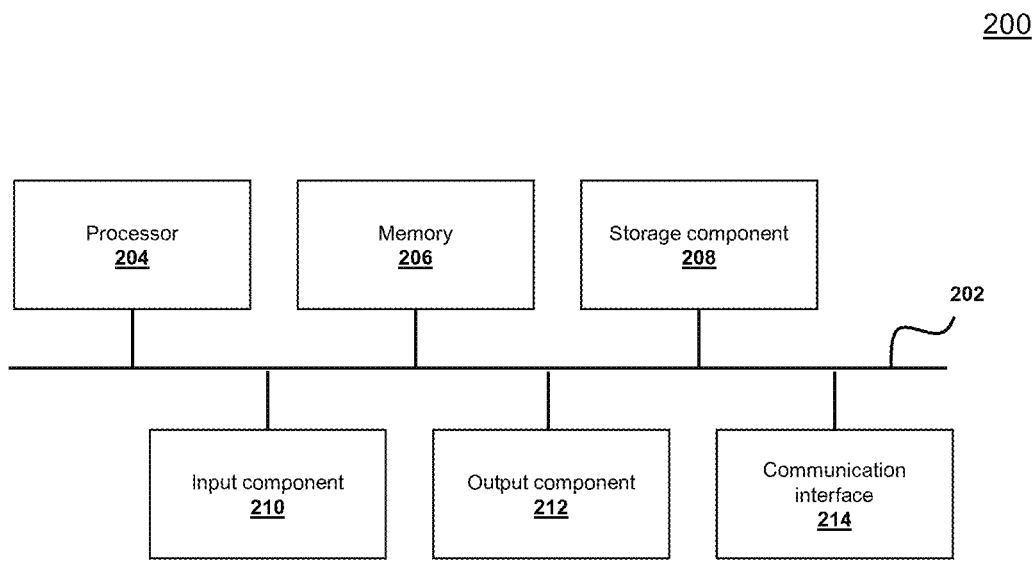
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
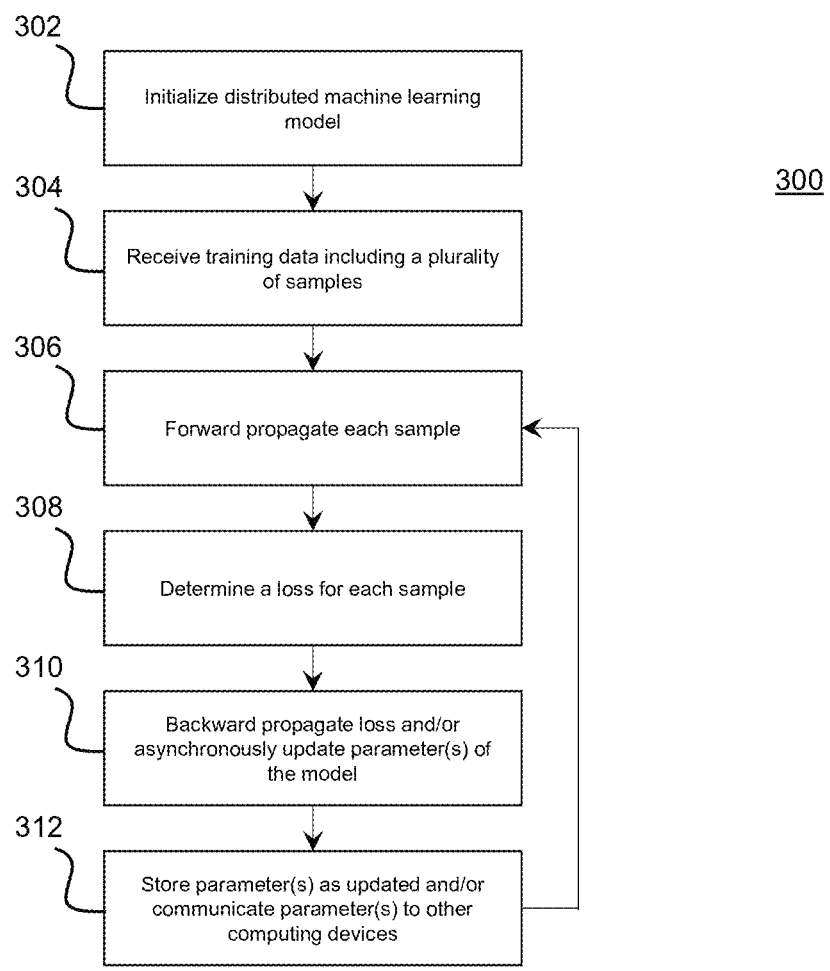
FIG. 3 is a flowchart of a non-limiting embodiment or aspect of a process for training distributed machine learning models according to the principles of the presently disclosed subject matter.

Referring now to FIG. 3, FIG. 3 is a flowchart of a non-limiting embodiment or aspect of a process 300 for training distributed machine learning models. In some non-limiting embodiments or aspects, one or more of the steps of process 300 may be performed (e.g., completely, partially, and/or the like) by transaction service provider system 102 (e.g., one or more devices of transaction service provider system 102). In some non-limiting embodiments or aspects, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), acquirer system 110 (e.g., one or more devices of acquirer system 110), and/or the like. In some non-limiting embodiments or aspects, a computing device may include a server, a computer, a portable computers, a laptop computer, a tablet computer, a mobile device, a cellular phone, a wearable device, a PDA, and/or the like. Additionally or alternatively, a computing device may be the same as or similar to device 200, a device of transaction service provider system 102, a device of issuer system 104, a customer device 106, a device of merchant system 108, a device of acquirer system 110, and/or the like. In some non-limiting embodiments or aspects, a distributed system may include a plurality of computing devices. Additionally or alternatively, a distributed system may be the same as or similar to a plurality of devices 200, transaction service provider system 102, issuer system 104, a plurality of customer devices 106, merchant system 108, acquirer system 110, and/or the like.

As shown in FIG. 3, at step 302, process 300 may include initializing a distributed machine learning model. For example, a distributed machine learning model may be initialized on a plurality of computing devices (e.g., of a distributed system). In some non-limiting embodiments or aspects, the distributed machine learning model may include a plurality of computational nodes (e.g., neurons, executors, containers, processes, transient compute processes, and/or the like). Additionally or alternatively, each computing device of the plurality of computing devices may include a respective subset of the plurality of computational nodes. In some non-limiting embodiments or aspects, each computational node may include at least one parameter (e.g., weight, bias, and/or the like).

In some non-limiting embodiments or aspects, initializing the distributed machine learning model may include setting the parameter(s) of each computational node to an initial value. In some non-limiting embodiments or aspects, the initial value of at least some parameters may include a selectable value (e.g., a preselected value, a predetermined value, any combination thereof, and/or the like). Additionally or alternatively, the initial value of at least some parameters may include a value from a previous training iteration (e.g., a current value and/or the like). Additionally or alternatively, the initial value of at least some parameters may include a random value (e.g., randomly selected from within a selectable range and/or the like).

In some non-limiting embodiments or aspects, the distributed machine learning model may include a deep neural network. Additionally or alternatively, each computational node of the plurality of computational nodes may include a neuron (e.g., artificial neuron, perceptron, and/or the like) of the deep neural network.

In some non-limiting embodiments or aspects, the plurality of computational nodes may be divided into a plurality of layers. Additionally or alternatively, each subset of computational nodes on a particular computing device may be associated with at least one layer of the plurality of layers, and/or each layer may be implemented on at least one of the plurality of computing devices. For example, a single computing device may include all computational nodes of a given layer. Additionally or alternatively, computational nodes of a given layer may be included on a set of computing devices (e.g., of the plurality of computing devices). Additionally or alternatively, a single computing device may include computational nodes from a set of layers (e.g., of the plurality of layers).

In some non-limiting embodiments or aspects, the parameter(s) of each computational node may include at least one of a weight parameter, a bias parameter, any combination thereof, and/or the like. For example, parameters for a computational node may include a plurality of weight parameters (e.g., at least one vector of weight parameters, at least one matrix of weight parameters, and/or the like) and at least one bias parameter. In some non-limiting embodiments or aspects, each computational node may have an activation function associated therewith. For example, an activation function may include at least one of a binary step function, a linear activation function, a rectified linear unit (ReLU), a sigmoid function, a logistic function, a hyperbolic tangent function, a softmax function, and/or the like.

In some non-limiting embodiments or aspects, each computing device may include commodity hardware processing capabilities and/or sufficient memory (e.g., cache memory and/or the like) to store the parameter(s) of the computational nodes thereof. For example, each computing device may include at least one (e.g., a respective subset and/or the like) of the plurality of computational nodes. In some non-limiting embodiments or aspects, each computational node may have a controller process (e.g., a daemon and/or the like) running thereon. For example, a controller process may include an aggregator service, e.g., that will interact with the computational nodes (e.g., transient compute processes and/or the like) running on the computing device. Additionally or alternatively, the controller process may aggregate the parameter(s) of the computational nodes (e.g., weights, biases, and/or the like) to communicate such parameters with controller processes running on computing devices in the distributed system, as described herein. For example, such communication between controller processes running on different computing devices may be via a message queue (e.g., a controller message queue and/or the like), as described herein. In some non-limiting embodiments or aspects, communication between two or more controller processes (e.g., on separate computing devices) may be asynchronous and/or non-blocking.

In some non-limiting embodiments or aspects, each computing device may include a cache. For example, each computing device in the distributed system may have assigned thereto at least a portion of a memory (e.g., cache memory and/or the like) that is reserved for storing parameter(s) of the computational nodes (e.g., learnable variables and/or the like). In some non-limiting embodiments or aspects, storing such parameter(s) in cache memory may allow for relatively fast (e.g., ultrafast and/or the like) access thereto and/or updating thereof (e.g., compared to persistent and/or non-volatile storage, such as a hard disk and/or the like). In some non-limiting embodiments or aspects, the parameter(s) stored in the cache of each computing device may be updated (e.g., by the controller process and/or the like), as described herein. Additionally or alternatively, updating such parameter(s) in the cache may be asynchronous, which may allow for the distributed system to run continuously (e.g., without blocking, halting, and/or the like its operations).

In some non-limiting embodiments or aspects, at least one message queue may be used to communicate data between computing devices in the distributed system. For example, a message queue may be based on publisher-subscriber model, e.g., a publisher (e.g., a given computing device) may publish a message to the queue, and subscriber(s) (e.g., at least one other computing device) may receive (e.g., read and/or the like) that message from the queue. In some non-limiting embodiments or aspects, a first message queue may include a control message queue. For example, a control message queue may include a distributed publisher-subscriber model queue to share control messages. For example, a control message may contain information about parameters (e.g., weights, biases, other learnable parameters, and/or the like), metadata related to computational nodes (e.g., transient compute processes and/or the like), any combination thereof, and/or the like.

In some non-limiting embodiments or aspects, a second message queue may include a data message queue. For example, a data message queue may include a distributed publisher-subscriber model queue to share data messages. For example, a data message may include training data on which the model is being trained, an intermediate output of at least one (e.g., the respective subset and/or the like) of the plurality of computational nodes, any combination thereof, and/or the like.

In some non-limiting embodiments or aspects, each computational node may include a transient compute process. For example, a transient compute process may include a container and/or process, which may read data messages (e.g., training samples, intermediate outputs of preceding computational nodes, and/or the like), e.g., from the data message queue, as input. Additionally or alternatively, each transient compute process may perform at least one computation (e.g., based on the activation function, the parameter(s) and/or the like thereof) and/or publish the result of such computation (e.g., an intermediate output), e.g., to the data message queue, for a next computational node to read (e.g., to use as the input thereto). Additionally or alternatively, during this computation, each transient compute process may provide (e.g., communicate to the controller process, store in the cache, and/or the like) the parameter(s) associated therewith.

In some non-limiting embodiments or aspects, the distributed system may include a backup storage. In some non-limiting embodiments or aspects, the backup storage may include a persistent (e.g., non-volatile and/or the like) storage to store the parameter(s) of each computational node. Additionally or alternatively, the parameter(s) stored in the backup storage may be used to recover such parameter(s) if one of the computing devices of the distributed system fails (e.g., if the cache is disturbed on one or more of the computing devices, if one of the computing devices crashes, if a network connection to one of the computing devices fails, and/or the like). In some non-limiting embodiments or aspects, the backup storage may include a cache memory (e.g., separate from the cache memories of the computing devices).

In some non-limiting embodiments or aspects, training data associated with a plurality of samples may be stored in a database. Additionally or alternatively, the database may store at least one label (e.g., expected output and/or the like) associated with each sample of the training data. For example, the database may include a key-value store to store labels associated with the training data. In some non-limiting embodiments or aspects, the labels may be used (e.g., by the controller process of the computing devices including the last layer of computational nodes of the distributed machine learning model) to determine the losses associated with the samples of the training data, as described herein.

In some non-limiting embodiments or aspects, a coordinator service may be running on at least one computing device of the plurality of computing devices. Additionally or alternatively, the coordinator service may include a highly available storage service. In some non-limiting embodiments or aspects, the coordinator service may persistently store the parameter(s) of the computational nodes. Additionally or alternatively, the coordinator service may not be expected to perform any computations based on the parameter(s) stored therein. Additionally or alternatively, the coordinator service may provide shared data storage to all computing devices of the distributed system.

In some non-limiting embodiments or aspects, a controller service may be running on at least one computing device of the plurality of computing devices. Additionally or alternatively, the controller service may include a highly available service. In some non-limiting embodiments or aspects, the controller service may be responsible for communication between the coordinator service and the computing devices on which the computational nodes of the distributed machine learning model are operating. Additionally or alternatively, the controller service may update at least one of the parameter(s) of the computational nodes (e.g., stored in a shared data storage, such as the coordinator service and/or the like) and/or may communicate the results of the update (e.g., the parameter(s) as updated) to the computing devices. Additionally or alternatively, the controller service may interact with the cache memory of each computing device and/or updates the parameter(s) of at least one of the respective subset of computational nodes of the computing device, as described herein.

As shown in FIG. 3, at step 304, process 300 may include receive training data including a plurality of samples. For example, a first computing device of the plurality of computing devices of the distributed system may receive training data associated with a plurality of samples.

In some non-limiting embodiments or aspects, each sample may include a vector having a plurality of features. Additionally or alternatively, the first computing device may have a computational node for each feature of the vector. For example, if an input vector has three features, the first computing device may include three computational nodes, and each of those nodes may receive a respective one of the features as input.

As shown in FIG. 3, at step 306, process 300 may include forward propagating each sample. For example, the plurality of computing devices of the distributed system may forward propagate each sample of the plurality of samples through the distributed machine learning model to generate an output for each sample of the plurality of samples.

In some non-limiting embodiments or aspects, forward propagating may include communicating, from each computing device of the plurality of computing devices other than a last computing device, an intermediate output of the respective subset of the plurality of computational nodes to a next computing device of the plurality of computing devices via a message queue (e.g., a data message queue and/or the like, as described herein). For example, the first computing device may receive each sample of the training data as input and calculate (e.g., using the computational nodes of the first computing device) an intermediate output based thereon. Each subsequent (e.g., next) computing device may receive the intermediate output from the preceding computing device as input and calculate (e.g., using the respective subset of computational nodes thereof) a respective intermediate output based on that input, and the respective intermediate output may be communicated (e.g., via the message queue) to the next computing device. As such, the intermediate output of each computing device (except for the last computing device) may be used as the input for the next computing device. Additionally or alternatively, the last computing device may receive the intermediate output from the previous (e.g., second-to-last and/or the like) computing device as input and calculate (e.g., using the respective subset of computational nodes of the last computing device) the output (e.g., final output) based on such input.

In some non-limiting embodiments or aspects, each computing device may initialize multiple computational nodes, as described herein. Additionally or alternatively, the computational nodes of the distributed machine learning model may receive the training data as input and forward propagate the input to generate an output based thereof (e.g., by calculating intermediate outputs with each computing device, as described herein, and writing such intermediate outputs to a data message queue, as described herein). Additionally or alternatively, the computational nodes of each computing device may communicate metadata related to the calculation of the intermediate output(s) (e.g., to a controller process running on the same computing device and/or the like). In some non-limiting embodiments or aspects, the controller process may receive inputs (e.g., metadata) from the computational nodes and/or communicate such metadata on a message queue (e.g., control message queue and/or the like), as described herein.

In some non-limiting embodiments or aspects, each computing device (other than the first computing device) may receive (e.g., read, retrieve, fetch, and/or the like) at least one message via the message queue(s) (e.g., the data message queue). For example, such message(s) may include the intermediate output from the preceding computing device. Additionally or alternatively, the computational nodes of each computing device may use the received intermediate output(s) from such messages as input(s) to calculate a respective intermediate output, as described herein. Additionally or alternatively, the computational nodes may communicate metadata associated with such calculation to the controller process on the respective computing device, and the controller process may communicate such metadata to the control message queue, as described herein.

As shown in FIG. 3, at step 308, process 300 may include determining a loss for each sample. For example, the last computing device may determine a loss for each sample of the plurality of samples based on the output.

In some non-limiting embodiments or aspects, a database may store a label for each sample of the plurality of samples. For example, the label may include an expected output associated with a respective sample.

In some non-limiting embodiments or aspects, determining the loss may include determining the loss for each sample of the plurality of samples based on the output and the label. For example, the last computing device may determine a loss based on the output and the label using a loss function. For example, the loss function may include an error value, a mean squared error, cross-entropy loss, a logarithmic loss, a regression loss, a mean absolute error loss, a mean squared logarithmic error loss, a binary classification loss, a binary cross-entropy loss, a hinge loss, a squared hinge loss, a multi-class classification loss, a multi-class cross-entropy loss, a spares multi-class cross-entropy loss, a Kullback Liebler divergence loss, a survival loss, any combination thereof, and/or the like.

In some non-limiting embodiments or aspects, when a sample (e.g., intermediate outputs based thereon) has forward propagated to the last layer of the distributed machine learning model (e.g., the last computing device(s) of the distributed system and/or the like), the computational nodes of the last layer (e.g., last computing device(s) and/or the like) may calculate the output, as described herein. Additionally or alternatively, the last computing device(s) may determine the loss based on the output, as described herein. In some non-limiting embodiments or aspects, data (e.g., metadata and/or the like) associated with the calculation of the output and/or the loss may be communicated to the controller process(es) of the last computing device(s). Additionally or alternatively, the controller process(es) may communicate the loss and/or at least one gradient value associated therewith via a message queue (e.g., the control message queue and/or the like).

As shown in FIG. 3, at step 310, process 300 may include backward propagating the loss and/or asynchronously updating parameter(s) of the model. For example, the loss for each sample of the plurality of samples may be backward propagated to each computing device of the plurality of computing devices. Additionally or alternatively, parameter(s) of each computational node may be asynchronously updated based on the loss for each sample as the loss is backward propagated while at least one other sample of the plurality of samples is forward propagating through the distributed machine learning model.

In some non-limiting embodiments or aspects, each computing device (other than the first computing device(s) associated with the first layer of the distributed machine learning model) may backward propagate the loss for each sample of the plurality of samples to a previous computing device of the plurality of computing devices. For example, backward propagating may include communicating, from each computing device (e.g., a controller process thereof and/or the like) other than the first computing device, a gradient value associated with the loss associated with the respective subset of the plurality of computational nodes to a previous computing device of the plurality of computing devices via a message queue (e.g., a control message queue). Additionally or alternatively, each respective computing device (e.g., a controller process thereof and/or the like) may receive the gradient value from the next computing device (e.g., via the control message queue), determine a respective gradient value for the respective subset of the plurality of computational nodes of the respective computing device (e.g., based on the received gradient value from the next computing device, the parameter(s) for each computational node, any combination thereof, and/or the like), and communicate the respective gradient value to the previous computing device (e.g., via the control message queue).

In some non-limiting embodiments or aspects, once the loss value is communicated to the message queue (e.g., control message queue), back propagation may take place. For example, every controller process of every computing device may read the message queue (e.g., control message queue) to receive (e.g., retrieve, read, fetch, and/or the like) the loss value and/or at least one gradient associated therewith. Additionally or alternatively, the controller process of every computing device may then update (e.g., asynchronously update and/or the like) the parameter(s) of the respective computational nodes thereof, as described herein.

In some non-limiting embodiments or aspects, the parameter(s) of each computational node may be asynchronously updated based on the loss (and/or at least one gradient value associated therewith) for each sample, e.g., as the loss (and/or at least one gradient value associated therewith) for each sample is backward propagated and/or while at least one other sample of the plurality of samples is forward propagating through the distributed machine learning model. In some non-limiting embodiments or aspects, the controller process of each respective computing device may asynchronously update the parameter(s) of the respective subset of the computational nodes of the respective computing device. In some non-limiting embodiments or aspects, the parameter(s) of the computational nodes may be updated by the controller process of the respective computing device directly using a memory reference of a cache location for each respective parameter, which may result in the updating being asynchronous.

In some non-limiting embodiments or aspects, the distributed system may perform scaling (e.g., adding a computational node, removing a computational node, any combination thereof, and/or the like) of the distributed machine learning model. For example, each respective computing device may determine a variance in the parameter(s) for each computational node of the respective subset of computation nodes thereon. In some non-limiting embodiments or aspects, at least one new computational node may be generated on at least one computing device based on the variance of at least one computational node of the respective subset of the plurality of computational nodes. For example, the at least one computing device may determine that a given computational node has a high variance (e.g., relative to other computational nodes). Additionally or alternatively, the given computational node with a high variance may be selected as a driver node. Based on the driver node(s) identified by the plurality of computing devices, at least one computing device may determine that a new computational node should be generated based on the variance, the loss (and/or a gradient value associate therewith), any combination thereof, and/or the like. The addition of the new computational node may enable the distributed machine learning model to understand (e.g., learn and/or the like) the feature(s) associated with the driver node(s) more accurately. In some non-limiting embodiments or aspects, at least one computational node may be removed from at least one computing device based on a determination that the distributed machine learning model is overfitting to the training data. Scaling is further described below with respect to FIGS. 6A and 6B.

In some non-limiting embodiments or aspects, the distributed system may perform self-healing (e.g., adding at least one new computational node in response to a computing device becoming unavailable and/or the like) of the distributed machine learning model. For example, the distributed system (e.g., the last computing device and/or the like) may determine the loss for a given sample of the plurality of samples satisfies a threshold associated with at least one computing device becoming unavailable (e.g., failing, crashing, losing a connection to a network and/or message queue, any combination thereof, and/or the like). In some non-limiting embodiments or aspects, after such determination, at least one computational node may be generated on at least one computing device, and the generated computational node(s) may include the parameter(s) associated with the computational node(s) of the unavailable computing device. For example, such parameter(s) may be received (e.g., retrieved, communicated, and/or the like) from the backup storage. In some non-limiting embodiments or aspects, after the determination that the loss satisfies a threshold associated with at least one computing device becoming unavailable, the distributed system may generate at least one computational node based on scaling, as described herein. For example, the variance in the parameter(s) may be determined for each computational node, and at least one new computational node may be generated on at least one computing device based on the variance, as described herein.

As shown in FIG. 3, at step 312, process 300 may include storing the parameter(s) (e.g., as updated) and/or communicating the parameter(s) to other computing devices. For example, each computing device may store the parameter(s) of each computational node of the respective subset of the plurality of computational nodes as updated. Additionally or alternatively, each computing device may communicate (e.g., to all other computing devices) data associated with the parameter(s) of each computational node of the respective subset of the plurality of computational nodes as updated. Additionally or alternatively, each of the other computing devices may store the parameter(s) of each computational node (e.g., from all computing devices) as updated.

In some non-limiting embodiments or aspects, storing the parameter(s) of each computational node may include storing the parameter(s) in at least one cache memory of each computing device. Additionally or alternatively, a backup storage may store the at least one parameter of each computational node, as described herein.

In some non-limiting embodiments or aspects, each computing device may communicate the parameter(s) of the computational nodes (e.g., as updated) thereon to a coordinator service. Additionally or alternatively, communicating the (updated) parameter(s) to the coordinator service may be non-blocking and/or asynchronous. In some non-limiting embodiments or aspects, the coordinator service may include a highly available distributed service, which may create copy of the parameter(s) received and/or may maintain up to date copies thereof.

In some non-limiting embodiments or aspects, a controller service may receive (e.g., retrieve, pull, fetch, and/or the like) the current parameter(s) from the coordinator service. Additionally or alternatively, the controller service may compute aggregates (e.g., statistics, metrics, gradients associated with the loss, and/or the like) for each computational node (e.g., the parameters thereof) of the distributed machine learning model. In some non-limiting embodiments or aspects, the controller service may communicate the aggregates to the individual computing devices. Such communication may be non-blocking and/or asynchronous.

In some non-limiting embodiments or aspects, each computing device may store a reference to the parameter(s). Additionally or alternatively, the controller service may asynchronously update that reference, e.g., so that, when the reference is used, the reference reflects the parameter(s) as updated.

In some non-limiting embodiments or aspects, since updating of the parameter(s) may be asynchronous, serial execution of the distributed machine learning model may be avoided, and instead, the distributed machine learning model may execute continuously until the termination condition thereof is met. Additionally or alternatively, the parameter(s) may be updated asynchronously, and since there is no mathematical difference in the calculations for parameter update, the convergence time of the distributed machine learning model may be expected to remain same or reduce.

Figure 4:
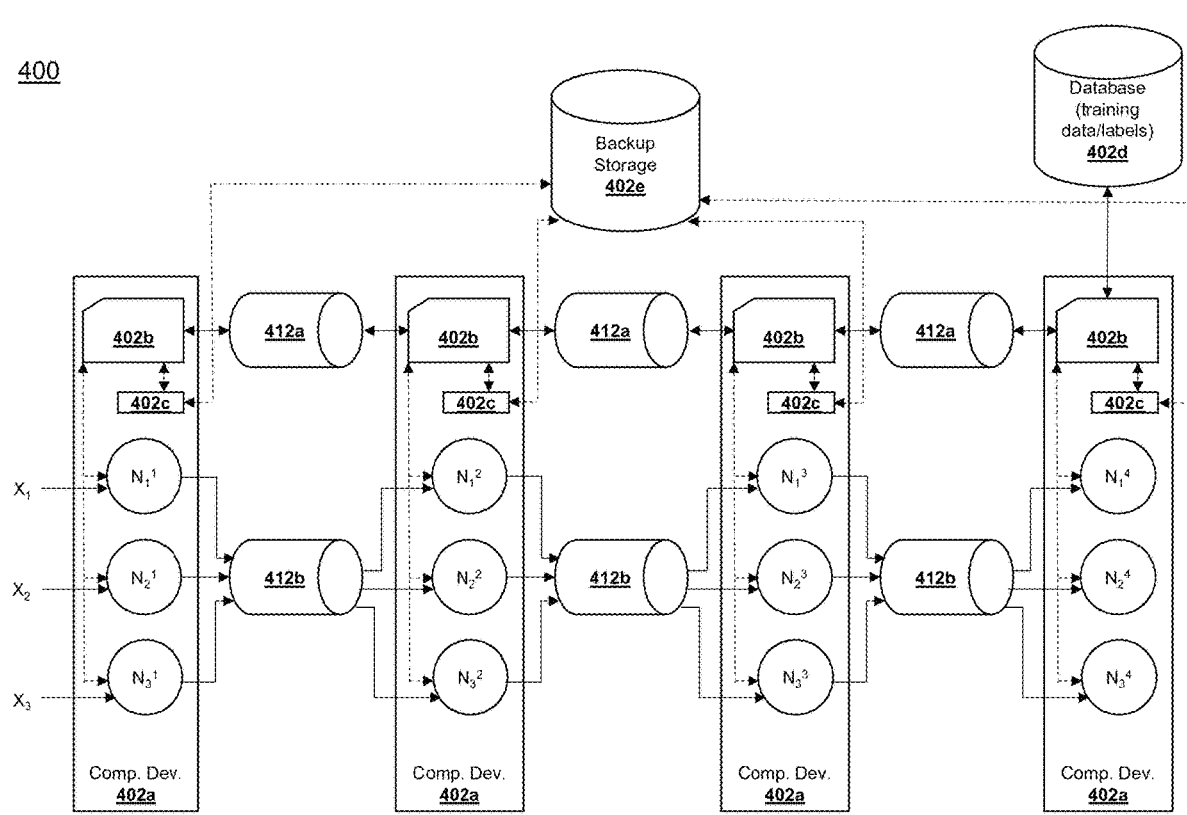
FIG. 4 is a diagram of a non-limiting embodiment or aspect of an implementation of a non-limiting embodiment or aspect of the process shown in FIG. 3 according to the principles of the presently disclosed subject matter.

Referring now to FIG. 4, FIG. 4 is a diagram of an exemplary implementation 400 of a non-limiting embodiment or aspect relating to process 300 shown in FIG. 3. As shown in FIG. 4, implementation 400 may include a plurality of computing devices 402a, a plurality of controller processes 402b, a plurality of cache memories 402c, a database 402d, a backup storage 402e, a control message queue 412a, a data message queue 412b, and a plurality of computational nodes N. In some non-limiting embodiments or aspects, each computing device 402a may be the same as or similar to the computing device(s) described above with respect to FIG. 3, device 200, a device of transaction service provider system 102, a device of issuer system 104, a customer device 106, a device of merchant system 108, a device of acquirer system 110, and/or the like. Additionally or alternatively, computing device 402a may include a server, a computer, a portable computers, a laptop computer, a tablet computer, a mobile device, a cellular phone, a wearable device, a PDA, and/or the like. In some non-limiting embodiments or aspects, each controller process 402b may be the same as or similar to the controller process described above with respect to FIG. 3. In some non-limiting embodiments or aspects, each cache memory 402c may be the same as or similar to the cache memory described above with respect to FIG. 3. In some non-limiting embodiments or aspects, database 402d may be the same as or similar to the database described above with respect to FIG. 3. In some non-limiting embodiments or aspects, backup storage 402e may be the same as or similar to the backup storage described above with respect to FIG. 3. In some non-limiting embodiments or aspects, control message queue 412a may be the same as or similar to the control message queue described above with respect to FIG. 3. In some non-limiting embodiments or aspects, data message queue 412b may be the same as or similar to the data message queue described above with respect to FIG. 3. In some non-limiting embodiments or aspects, each computational node N may be the same as or similar to the computational node(s) described above with respect to FIG. 3. Additionally or alternatively, the notation $N_i^j$ may indicate the ith computational node of the jth computing device 402a.

In some non-limiting embodiments or aspects, a distributed machine learning model may include the plurality of computational nodes N, as described herein. Additionally or alternatively, the distributed machine learning model (e.g., the computational nodes N thereof) may be initialized, as described herein.

In some non-limiting embodiments or aspects, a first computing device 402a may receive (e.g., from database 402d and/or the like) training data including a plurality of samples, as described herein. For example, each sample of the training data may include a vector, as described herein. For the purpose of illustration, if an input vector has three features (e.g., $X_1$, $X_2$, and $X_3$), the first computing device 402a may include three computational nodes (e.g., $N_1^1$, $N_2^1$, and $N_3^1$), and each of those computational nodes may receive a respective one of the features as input.

In some non-limiting embodiments or aspects, the plurality of computing devices 402a (e.g., the computational nodes N thereof) may forward propagate each sample, as described herein. For example, forward propagating may include each computing device 402a (e.g., other than the last computing device 402a) communicating an intermediate output of the respective subset of the computational nodes N to a next computing device 402a via data message queue 412b, as described herein.

In some non-limiting embodiments or aspects, the last computing device 402a (e.g., controller process 402b thereof and/or the like) may calculate the output for each sample of the training data, as described herein. Additionally or alternatively, the last computing device 402a (e.g., controller process 402b thereof and/or the like) may determine the loss for each sample of the training data based on the output and the label associated with the respective sample (e.g., in database 402d).

In some non-limiting embodiments or aspects, the plurality of computing devices 402a (e.g., the controller processes 402b thereof and/or the like) may backward propagate the loss, as described herein. For example, each computing device 402a (e.g., the controller processes 402b thereof and/or the like) other than the first computing device 402a may backward propagate the loss (and/or at least one gradient value associated therewith) for each sample to a previous computing device 402a via a control message queue 412a, as described herein.

In some non-limiting embodiments or aspects, the plurality of computing devices 402a (e.g., the controller processes 402b thereof and/or the like) may asynchronously update the parameter(s) of each computational node N based on the loss (and/or at least one gradient value associated therewith) for each sample, e.g., as the loss (and/or gradient value(s)) for each sample is backward propagated and/or while at least one other sample of the plurality of samples is forward propagating through the distributed machine learning model (e.g., the computational nodes N thereof). In some non-limiting embodiments or aspects, the parameter(s) of each computational node N may be updated by the respective controller process 402b of the respective computing device 402a directly using a memory reference of a location in cache memory 402c for each respective parameter, as described herein.

In some non-limiting embodiments or aspects, the parameter(s) of each computational node N may be stored by backup storage 402e, as described herein. For example, the parameter(s) and/or data associated therewith may be received by (e.g., retrieved by, communicated to, and/or the like) backup storage 402e from the plurality of cache memories 402c, as described herein.

Figure 5:
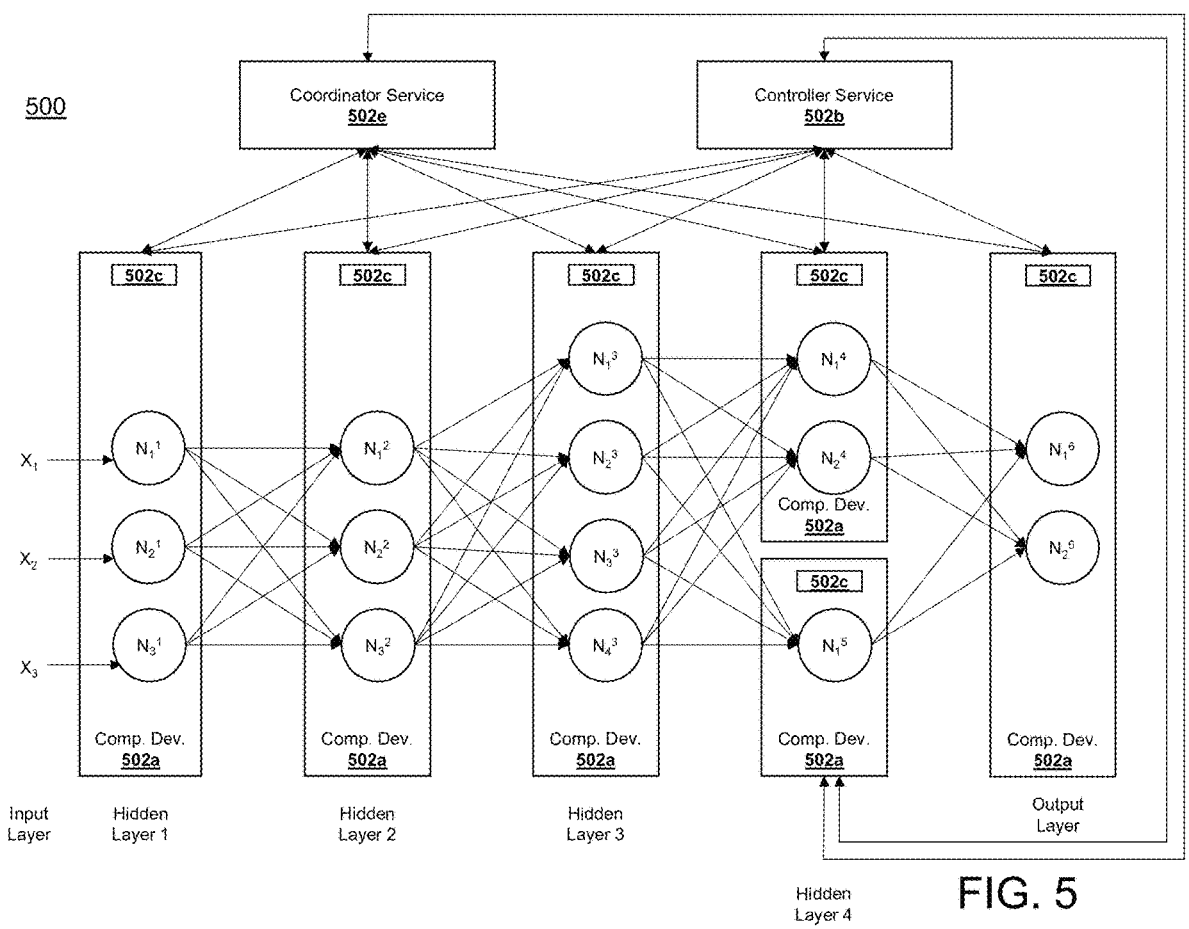
FIG. 5 is a diagram of a non-limiting embodiment or aspect of an implementation of a non-limiting embodiment or aspect of the process shown in FIG. 3 according to the principles of the presently disclosed subject matter.

Referring now to FIG. 5, FIG. 5 is a diagram of an exemplary implementation 500 of a non-limiting embodiment or aspect relating to process 300 shown in FIG. 3. As shown in FIG. 5, implementation 500 may include a plurality of computing devices 502a, a controller service 502b, a plurality of cache memories 502c, a coordinator service 502e, and a plurality of computational nodes N. In some non-limiting embodiments or aspects, each computing device 502a may be the same as or similar to the computing device(s) described above with respect to FIG. 3, device 200, computing device 402a, a device of transaction service provider system 102, a device of issuer system 104, a customer device 106, a device of merchant system 108, a device of acquirer system 110, and/or the like. Additionally or alternatively, computing device 502a may include a server, a computer, a portable computers, a laptop computer, a tablet computer, a mobile device, a cellular phone, a wearable device, a PDA, and/or the like. In some non-limiting embodiments or aspects, controller service 502b may be the same as or similar to the controller service described above with respect to FIG. 3. Additionally or alternatively, controller service 502b may include a device 200, a server, a computer, a portable computers, a laptop computer, a tablet computer, a mobile device, a cellular phone, a wearable device, a PDA, and/or the like. In some non-limiting embodiments or aspects, each cache memory 502c may be the same as or similar to the cache memory described above with respect to FIG. 3, cache memory 402c, and/or the like. In some non-limiting embodiments or aspects, coordinator service 502e may be the same as or similar to the coordinator service described above with respect to FIG. 3. Additionally or alternatively, coordinator service 502e may include a device 200, a server, a computer, a portable computers, a laptop computer, a tablet computer, a mobile device, a cellular phone, a wearable device, a PDA, and/or the like. In some non-limiting embodiments or aspects, each computational node N may be the same as or similar to the computational node(s) described above with respect to FIG. 3, the computational node(s) described above with respect to FIG. 4, and/or the like. Additionally or alternatively, the notation $N_i^j$ may indicate the ith computational node of the jth computing device 502a.

In some non-limiting embodiments or aspects, a distributed machine learning model may include the plurality of computational nodes N, as described herein. Additionally or alternatively, the distributed machine learning model (e.g., the computational nodes N thereof) may be initialized, as described herein. In some non-limiting embodiments or aspects, the computational nodes N may be divided into a plurality of layers, as described herein. For example, the plurality of layers may include an input layer, at least one hidden layer (e.g., hidden layers 1-4), and an output layer. Additionally or alternatively, the computational nodes N on a first computing device 502a may correspond to an input layer and/or a first hidden layer, the computational nodes N on a second computing device 502a may correspond to a second hidden layer, the computational nodes N on a third computing device 502a may correspond to a third hidden layer, the computational nodes N on fourth and fifth computing devices 502a may correspond to a fourth hidden layer, and the computational nodes N on a last (e.g., sixth) computing device 502a may correspond to an output layer.

In some non-limiting embodiments or aspects, a first computing device 502a may receive training data including a plurality of samples, as described herein. For example, each sample of the training data may include a vector, as described herein. For the purpose of illustration, if an input vector has three features (e.g., $X_1$, $X_2$, and $X_3$), the first computing device 502a may include three computational nodes (e.g., $N_1^1$, $N_2^1$, and $N_3^1$), and each of those computational nodes may receive a respective one of the features as input.

In some non-limiting embodiments or aspects, the plurality of computing devices 502a (e.g., the computational nodes N thereof) may forward propagate each sample, as described herein. For example, forward propagating may include each computing device 502a (e.g., other than the last computing device 502a) communicating an intermediate output of the respective subset of the computational nodes N to a next computing device 502a, as described herein. In some non-limiting embodiments or aspects, the last computing device 502a may calculate the output for each sample of the training data, as described herein.

In some non-limiting embodiments or aspects, controller service 502a may determine the loss for each sample of the training data based on the output, as described herein. Additionally or alternatively, controller service 502b may compute aggregates (e.g., statistics, metrics, gradients associated with the loss, and/or the like) for each computational node N (e.g., the parameters thereof) of the distributed machine learning model, as described herein. In some non-limiting embodiments or aspects, controller service 502b may communicate the aggregates to the individual computing devices 502a, as described herein.

In some non-limiting embodiments or aspects, controller service 502b may update at least one of the parameter(s) of the computational nodes (e.g., stored in a shared data storage, such as coordinator service 502e and/or the like) and/or may communicate the results of the update (e.g., the parameter(s) as updated) to the computing devices 502a, as described herein. Additionally or alternatively, controller service 502b may interact with the cache memory of each computing device and/or updates the parameter(s) of at least one of the respective subset of computational nodes of the computing device, as described herein. In some non-limiting embodiments or aspects, each computing device 502b may store a reference to the parameter(s) of respective computational nodes N associated therewith, as described herein. Additionally or alternatively, controller service 502b may asynchronously update that reference, e.g., so that, when the reference is used, the reference reflects the parameter(s) as updated.

In some non-limiting embodiments or aspects, each computing device 502a may communicate the parameter(s) of the computational nodes N (e.g., as updated) thereon to coordinator service 502e, as described herein. Additionally or alternatively, coordinator service 502e may persistently store the parameter(s) of the computational nodes N. Additionally or alternatively, coordinator service 502e may provide shared data storage to all computing devices of the distributed system.

Figure 6A:
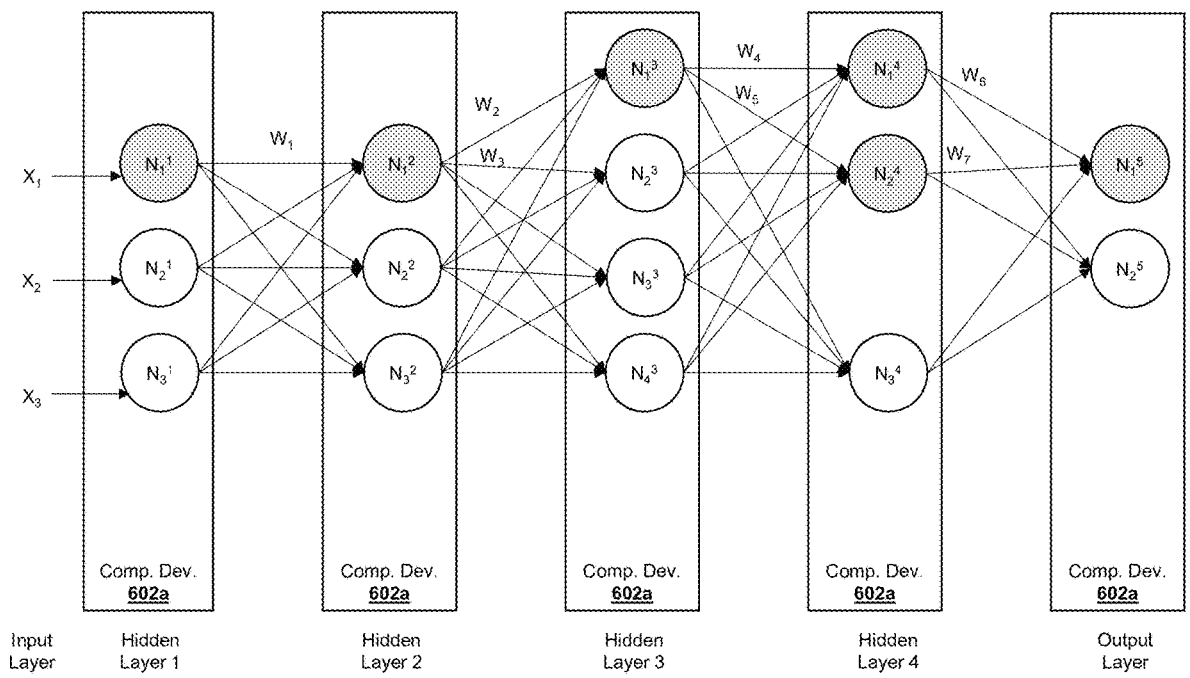
FIGS. 6A and 6B are diagrams of a non-limiting embodiment or aspect of an implementation of a non-limiting embodiment or aspect of the process shown in FIG. 3 according to the principles of the presently disclosed subject matter.
Figure 6B:
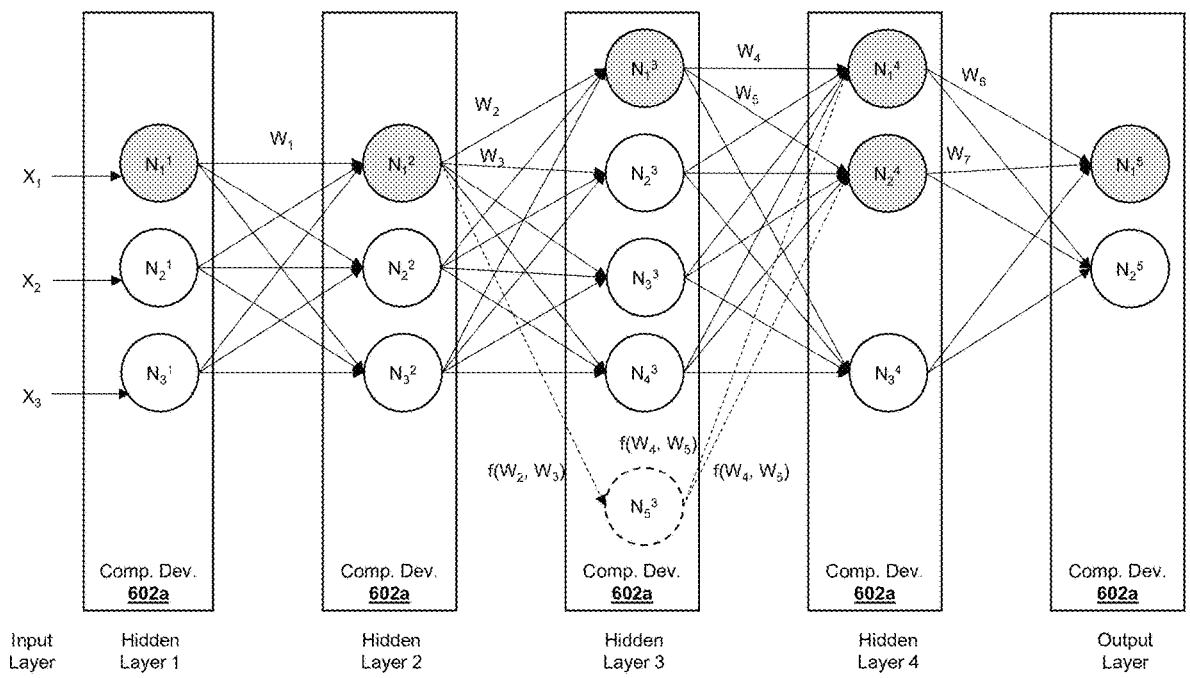

Referring now to FIGS. 6A and 6B, FIGS. 6A and 6B are diagrams of an exemplary implementation 600 of a non-limiting embodiment or aspect relating to process 300 shown in FIG. 3. As shown in FIGS. 6A and 6B, implementation 600 may include a plurality of computing devices 602a and a plurality of computational nodes N. In some non-limiting embodiments or aspects, each computing device 602a may be the same as or similar to the computing device(s) described above with respect to FIG. 3, device 200, computing device 402a, computing device 502a, a device of transaction service provider system 102, a device of issuer system 104, a customer device 106, a device of merchant system 108, a device of acquirer system 110, and/or the like. Additionally or alternatively, computing device 602a may include a server, a computer, a portable computers, a laptop computer, a tablet computer, a mobile device, a cellular phone, a wearable device, a PDA, and/or the like. In some non-limiting embodiments or aspects, each computational node N may be the same as or similar to the computational node(s) described above with respect to FIG. 3, the computational node(s) described above with respect to FIG. 4, the computational node(s) described above with respect to FIG. 5, and/or the like. Additionally or alternatively, the notation $N_i^j$ may indicate the ith computational node of the jth computing device 602a.

In some non-limiting embodiments or aspects, the distributed system (e.g., computing devices 602a) may perform scaling of the distributed machine learning model (e.g., the plurality of computational nodes N), as described herein. For example, each respective computing device 602a may determine a variance in the parameter(s) for each computational node N of the respective subset of computation nodes N thereon. For example, the computing device(s) may determine that a certain computational nodes N (e.g., the shaded nodes as shown in FIG. 6A) have a high variance (e.g., relative to other computational nodes N). Additionally or alternatively, these certain computational nodes N (e.g., the shaded computational nodes) with high variance may be selected as driver nodes, as described herein. Based on the driver node(s) (e.g., the shaded computational nodes), computing device(s) 602a may determine that a new computational node should be generated, as described herein. For the purpose of illustration, as shown in FIG. 6B, computing device(s) 602a may generate computational node $N_5^3$ in a third computing device 602a and/or in a third hidden layer, as described herein.

In some non-limiting embodiments or aspects, the actual output for a given sample of training data and the expected output (e.g., label) associated therewith may be used to calculate the difference between the expected and the actual predicted value (e.g., similar to loss calculation). Additionally or alternatively, controller service will also identify the executors that played the major role in driving the network to predict that particular outcome, those nodes shall be called driver nodes.

In some non-limiting embodiments or aspects, the variance in the parameter(s) for each computational node N may be based on a function of the change in the output value and the input value of the computational node N. Additionally or alternatively, such variance may be based on a function of the parameter(s) (e.g., weight parameters W, bias parameter b, and/or the like) of the computational node, which may be represented with the following formula:

$$Output = W * Input + b$$

Figure 7A:
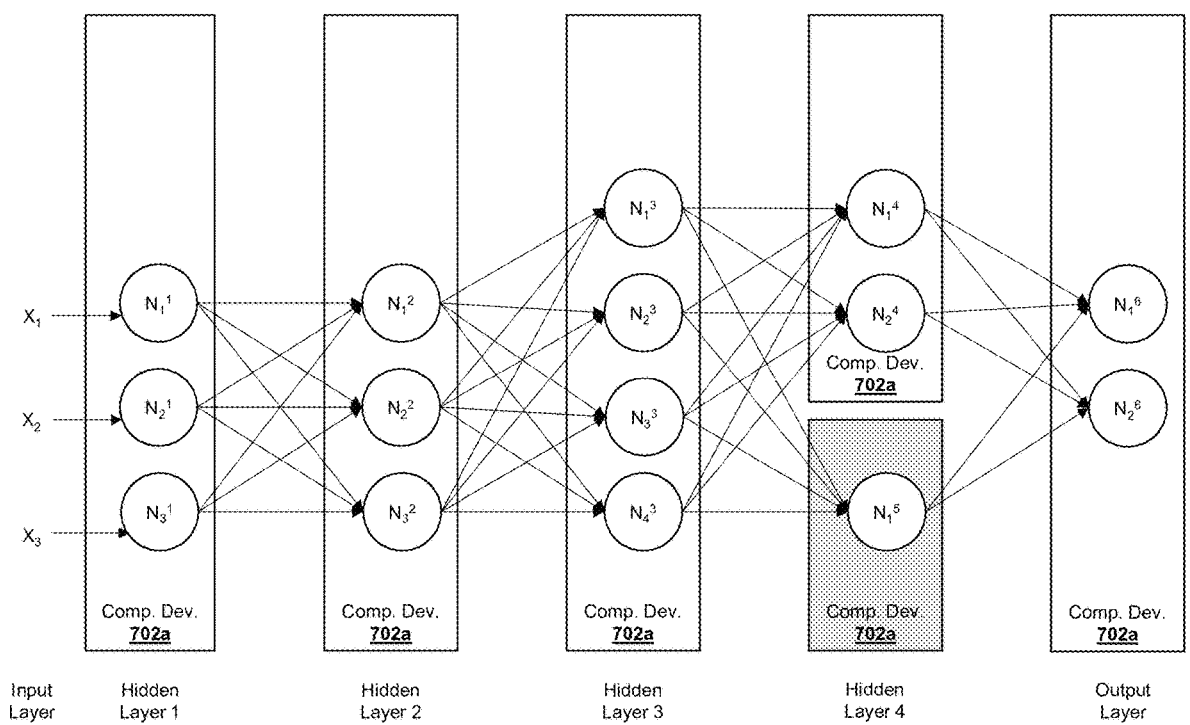
FIGS. 7A and 7B are diagrams of a non-limiting embodiment or aspect of an implementation of a non-limiting embodiment or aspect of the process shown in FIG. 3 according to the principles of the presently disclosed subject matter.
Figure 7B:
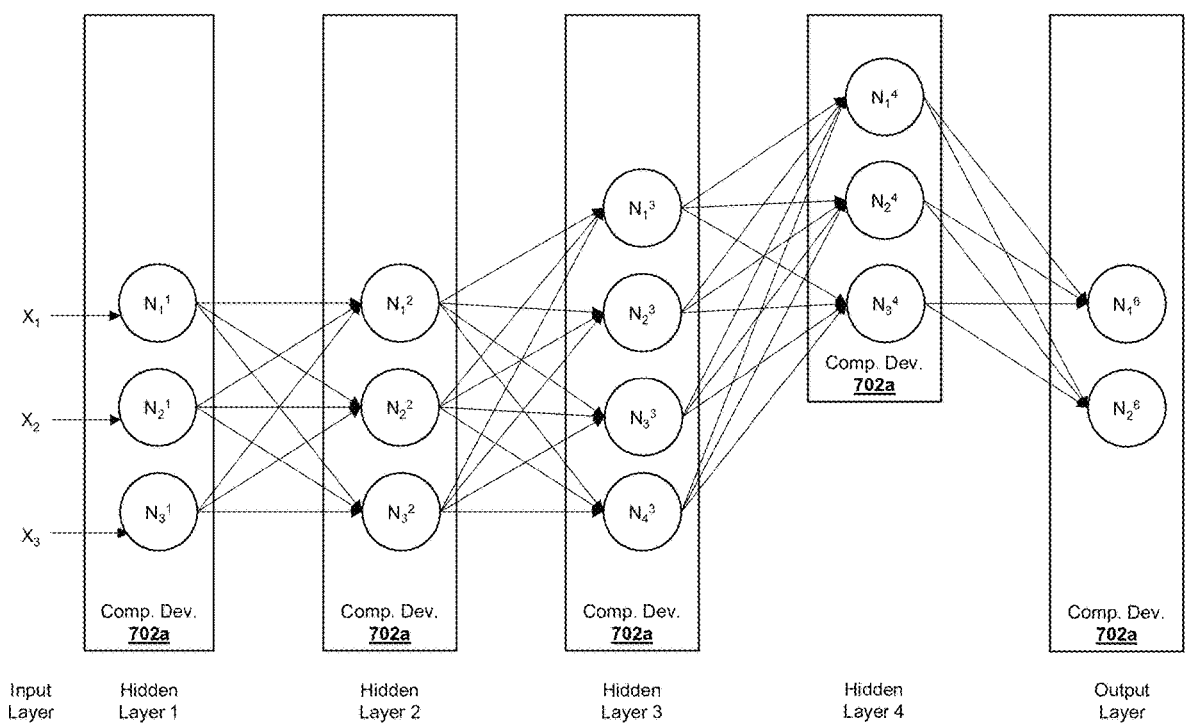

Referring now to FIGS. 7A and 7B, FIGS. 7A and 7B are diagrams of an exemplary implementation 700 of a non-limiting embodiment or aspect relating to process 300 shown in FIG. 3. As shown in FIGS. 7A and 7B, implementation 700 may include a plurality of computing devices 702a and a plurality of computational nodes N. In some non-limiting embodiments or aspects, each computing device 702a may be the same as or similar to the computing device(s) described above with respect to FIG. 3, device 200, computing device 402a, computing device 502a, computing device 602a, a device of transaction service provider system 102, a device of issuer system 104, a customer device 106, a device of merchant system 108, a device of acquirer system 110, and/or the like. Additionally or alternatively, computing device 602a may include a server, a computer, a portable computers, a laptop computer, a tablet computer, a mobile device, a cellular phone, a wearable device, a PDA, and/or the like. In some non-limiting embodiments or aspects, each computational node N may be the same as or similar to the computational node(s) described above with respect to FIG. 3, the computational node(s) described above with respect to FIG. 4, the computational node(s) described above with respect to FIG. 5, the computational node(s) described above with respect to FIG. 6, and/or the like. Additionally or alternatively, the notation $N_i^j$ may indicate the ith computational node of the jth computing device 702a.

In some non-limiting embodiments or aspects, the distributed system (e.g., computing devices 702a) may perform self-healing (e.g., adding at least one new computational node N in response to at least one computing device 702a becoming unavailable and/or the like) of the distributed machine learning model, as described herein. For example, the distributed system (e.g., the last computing device and/or the like) may determine the loss for a given sample of the plurality of samples satisfies a threshold associated with at least one computing device becoming unavailable (e.g., failing, crashing, losing a connection to a network and/or message queue, any combination thereof, and/or the like), as described herein. For the purpose of illustration, as shown in FIG. 7A, the shaded computing device (e.g., fifth computing device) may become unavailable.

In some non-limiting embodiments or aspects, after such determination, at least one computational node (e.g., computational node $N_3^4$) may be generated on at least one computing device 702a (e.g., the fourth computing device 702a), as described herein. In some non-limiting embodiments or aspects, the generated computational node $N_3^4$ may include the parameter(s) associated with the computational node(s) (e.g., $N_1^5$) of the unavailable computing device 702a (e.g., fifth computing device 702a).

In some non-limiting embodiments or aspects, after the determination that the loss satisfies a threshold associated with at least one computing device becoming unavailable, the distributed system (e.g., at least one other computing device 702a) may generate at least one computational node N based on scaling, as described herein. For example, the variance in the parameter(s) may be determined for each computational node N, and at least one new computational node (e.g., computational node $N_3^4$) may be generated on at least one computing device 702a (e.g., the fourth computing device 702a) based on the variance, as described herein.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A computer-implemented method for training a distributed machine learning model, comprising:

initializing a distributed machine learning model on a plurality of computing devices, the distributed machine learning model comprising a plurality of computational nodes, each computing device of the plurality of computing devices comprising a respective subset of the plurality of computational nodes, each computational node comprising at least one parameter;

receiving training data associated with a plurality of samples at a first computing device of the plurality of computing devices;

forward propagating each sample of the plurality of samples through the distributed machine learning model to generate an output for each sample of the plurality of samples;

determining a loss for each sample of the plurality of samples based on the output;

backward propagating the loss for each sample of the plurality of samples to each computing device of the plurality of computing devices;

asynchronously updating the at least one parameter of each computational node based on the loss for each sample as the loss for each sample is backward propagated while at least one of the plurality of samples is forward propagating through the distributed machine learning model;

storing, at each computing device of the plurality of computing devices, the at least one parameter of each computational node of the respective subset of the plurality of computational nodes as updated;

communicating, from each computing device of the plurality of computing devices to all other computing devices of the plurality of computing devices, data associated with the at least one parameter of each computational node of the respective subset of the plurality of computational nodes as updated, each of the other computing devices of the plurality of computing devices storing the at least one parameter of each computational node as updated;

determining the loss for a first sample of the plurality of samples satisfies a threshold associated with at least one computing device of the plurality of computing devices becoming unavailable;

in response to determining the loss for the first sample satisfies the threshold, determining a variance in the at least one parameter for each computational node; and generating at least one new computational node on at least one computing device of the plurality of computing devices based on the variance of at least one computational node of the respective subset of the plurality of computational nodes.

2. The method of claim 1, wherein the distributed machine learning model comprises a deep neural network and each computational node of the plurality of computational nodes comprises a neuron.

3. The method of claim 1, wherein the plurality of computational nodes are divided into a plurality of layers, each subset of computational nodes being associated with at least one layer of the plurality of layers, each layer being implemented on at least one of the plurality of computing devices.

4. The method of claim 1, wherein the at least one parameter of each computational node comprises at least one of a weight parameter, a bias parameter, or any combination thereof.

5. The method of claim 1, wherein storing the at least one parameter of each computational node comprises storing the at least one parameter of each computational node in at least one cache memory of each computing device of the plurality of computing devices.

6. The method of claim 5, further comprising storing, in a backup storage, the at least one parameter of each computational node of the plurality of computational nodes.

7. The method of claim 1, wherein forward propagating comprises communicating, from each computing device of the plurality of computing devices other than a last computing device, an intermediate output of the respective subset of the plurality of computational nodes to a next computing device of the plurality of computing devices via a first message queue.

8. The method of claim 7, wherein backward propagating comprises communicating, from each computing device of the plurality of computing devices other than the first computing device, a gradient value associated with the loss associated with the respective subset of the plurality of computational nodes to a previous computing device of the plurality of computing devices via a second message queue.

9. The method of claim 1, further comprising storing, in a database, a label for each sample of the plurality of samples, wherein determining the loss comprises determining the loss for each sample of the plurality of samples based on the output and the label.

10. A system for training a distributed machine learning model, comprising:
a plurality of computing devices, each computing device of the plurality of computing devices comprising a respective subset of a plurality of computational nodes of a distributed machine learning model, each computational node comprising at least one parameter, each computing device comprising at least one processor and at least one non-transitory computer-readable medium including one or more instructions that, when executed by the at least one processor, cause the at least one processor to:
forward propagate each sample of a plurality of samples of training data through the distributed machine learning model to generate an output for each sample of the plurality of samples;
determine a loss for each sample of the plurality of samples based on the output;
backward propagate the loss for each sample of the plurality of samples to each computing device of the plurality of computing devices;
asynchronously update the at least one parameter of each computational node based on the loss for each sample as the loss for each sample is backward propagated while at least one of the plurality of samples is forward propagating through the distributed machine learning model;
store, at each computing device of the plurality of computing devices, the at least one parameter of each computational node of the respective subset of the plurality of computational nodes as updated;
communicate, from each computing device of the plurality of computing devices to all other computing devices of the plurality of computing devices, data associated with the at least one parameter of each computational node of the respective subset of the plurality of computational nodes as updated, each of the other computing devices of the plurality of computing devices storing the at least one parameter of each computational node as updated;
determine the loss for a first sample of the plurality of samples satisfies a threshold associated with at least one computing device of the plurality of computing devices becoming unavailable;
in response to determining the loss for the first sample satisfies the threshold, determine a variance in the at least one parameter for each computational node; and
generate at least one new computational node on at least one computing device of the plurality of computing devices based on the variance of at least one computational node of the respective subset of the plurality of computational nodes.

11. The system of claim 10, wherein the distributed machine learning model comprises a deep neural network and each computational node of the plurality of computational nodes comprises a neuron, and
wherein the plurality of computational nodes are divided into a plurality of layers, each subset of computational nodes being associated with at least one layer of the plurality of layers, each layer being implemented on at least one of the plurality of computing devices.

12. The system of claim 10, wherein each computing device of the plurality of computing devices comprises at least one cache memory, and
wherein storing the at least one parameter of each computational node comprises storing the at least one parameter of each computational node in the at least one cache memory of each computing device of the plurality of computing devices.

13. The system of claim 12, further comprising a backup storage, wherein the backup storage is configured to store the at least one parameter of each computational node of the plurality of computational nodes.

14. The system of claim 10, further comprising a first message queue, wherein forward propagating comprises communicating, from each computing device of the plurality of computing devices other than a last computing device, an intermediate output of the respective subset of the plurality of computational nodes to a next computing device of the plurality of computing devices via the first message queue.

15. The system of claim 14, further comprising a second message queue, wherein backward propagating comprises communicating, from each computing device of the plurality of computing devices other than a first computing device, a gradient value associated with the loss associated with the respective subset of the plurality of computational nodes to a previous computing device of the plurality of computing devices via the second message queue.

16. The system of claim 10, further comprising a database configured to store a label for each sample of the plurality of samples, wherein determining the loss comprises determining the loss for each sample of the plurality of samples based on the output and the label.

17. A computer program product for training a distributed machine learning model, the computer program product comprising at least one non-transitory computer-readable medium including one or more instructions that, when executed by at least one processor, cause the at least one processor to:

initialize a respective subset of a plurality of computational nodes of a distributed machine learning model, each computational node comprising at least one parameter;

receive training data associated with a plurality of samples;

forward propagate each sample of the plurality of samples through the respective subset of the plurality of computational nodes of the distributed machine learning model to generate an intermediate output for each sample of the plurality of samples;

determine a gradient value associated with a loss associated with the respective subset of the plurality of computational nodes for each sample of the plurality of samples;

backward propagate the gradient value for each sample of the plurality of samples through the respective subset of the plurality of computational nodes of the distributed machine learning model;

asynchronously update the at least one parameter of each computational node based on the gradient value associated with the loss for each sample as the gradient value associated with the loss for each sample is backward propagated while at least one of the plurality of samples is forward propagating through the distributed machine learning model;

store the at least one parameter of each computational node of the respective subset of the plurality of computational nodes as updated;

communicate, to at least one computing device, data associated with the at least one parameter of each computational node of the respective subset of the plurality of computational nodes as updated to cause the at least one computing device to store the at least one parameter of each computational node as updated;

determine the loss for a first sample of the plurality of samples satisfies a threshold associated with at least one computing device of the plurality of computing devices becoming unavailable;

in response to determining the loss for the first sample satisfies the threshold, determine a variance in the at least one parameter for each computational node; and generate at least one new computational node on at least one computing device of the plurality of computing devices based on the variance of at least one computational node of the respective subset of the plurality of computational nodes.

* * * * *